US007861285B2

(12) United States Patent
Ashoff et al.

(10) Patent No.: US 7,861,285 B2
(45) Date of Patent: *Dec. 28, 2010

(54) SYSTEM, METHOD AND COMPUTER PROGRAM PRODUCT FOR AUTHENTICATING USERS USING A LIGHTWEIGHT DIRECTORY ACCESS PROTOCOL (LDAP) DIRECTORY SERVER

(75) Inventors: Thomas D. Ashoff, Mt. Airy, MD (US); Steve O. Chew, Pittsburgh, PA (US); Jeffrey J. Graham, Olney, MD (US); Andrew J. Mullican, Columbia, MD (US)

(73) Assignee: McAfee, Inc., Santa Clara, CA (US)

( * ) Notice: Subject to any disclaimer, the term of this patent is extended or adjusted under 35 U.S.C. 154(b) by 899 days.

This patent is subject to a terminal disclaimer.

(21) Appl. No.: 11/672,296

(22) Filed: Feb. 7, 2007

(65) Prior Publication Data
US 2007/0136803 A1 Jun. 14, 2007

Related U.S. Application Data

(63) Continuation of application No. 09/495,157, filed on Jan. 31, 2000, now Pat. No. 7,185,361.

(51) Int. Cl.
*H02H 3/05* (2006.01)
(52) U.S. Cl. ............................ 726/4; 713/151; 713/154; 707/705; 726/2; 726/8; 726/11; 726/12; 726/14
(58) Field of Classification Search ................ 726/4, 726/8, 11–14; 713/151–152, 154; 707/1; 709/220–222, 227–229
See application file for complete search history.

(56) References Cited

U.S. PATENT DOCUMENTS

| 5,657,390 | A | 8/1997 | Elgamal et al. |
|---|---|---|---|
| 5,898,830 | A | 4/1999 | Wesinger, Jr. et al. |
| 6,047,322 | A | 4/2000 | Vaid et al. |
| 6,131,120 | A | 10/2000 | Reid |
| 6,182,142 | B1 | 1/2001 | Win et al. |
| 6,212,558 | B1 | 4/2001 | Antur et al. |
| 6,233,688 | B1 | 5/2001 | Montenegro |
| 6,321,336 | B1 * | 11/2001 | Applegate et al. ............. 726/11 |
| 6,324,648 | B1 | 11/2001 | Grantges, Jr. |
| 6,357,010 | B1 * | 3/2002 | Viets et al. ...................... 726/4 |
| 6,718,388 | B1 * | 4/2004 | Yarborough et al. ......... 709/227 |
| 6,754,831 | B2 * | 6/2004 | Brownell ...................... 726/15 |
| 2003/0126468 | A1 | 7/2003 | Markham |

OTHER PUBLICATIONS

"Defination of Application Gateway", *Webopedia Computer Dictionary*, http://www.webopedia.com/TERM/A/application_gateway.html.
"Defination of Firewall", *Webopedia Computer Dictionary*, http://www.webopedia.com/TERM/firewall.html.
"FireWall—1 Architecture and Adminstration", *Chapter* 4, (Sep. 1998),135-154.

(Continued)

*Primary Examiner*—Minh Dieu Nguyen
(74) *Attorney, Agent, or Firm*—Schwegman, Lundberg & Woessner, P.A.

(57) ABSTRACT

A system, method and computer program product for providing authentication to a firewall using a lightweight directory access protocol (LDAP) directory server is disclosed. The firewall can be configured through a graphical user interface to implement an authentication scheme. The authentication scheme is based upon a determination of whether at least part of one or more LDAP entries satisfy an authorization filter.

16 Claims, 5 Drawing Sheets

OTHER PUBLICATIONS

"How to Securely Manage and Control User Access to E-Commerce Web Sites", *Netegrity White Paper*, (Jul. 1999).

"Netegrity", *SiteMinder 3.5 Archetecture*.

Check Point Software, "Check Point Account Management Client, Version 1.0", *Check Point User Guide*, (Sep. 1998),1-75.

Howes, T., et al., "The LDAP Application Program Interface", Request for Comments: 1823; University of Michigan,(Aug. 1995),pp. 1-30.

Microsoft Corporation, "Microsoft Press computer dictionary", *Redmond, WA : Microsoft Press*, 3rd Edition,(1997),197.

* cited by examiner

SYSTEM, METHOD AND COMPUTER PROGRAM PRODUCT FOR AUTHENTICATING USERS USING A LIGHTWEIGHT DIRECTORY ACCESS PROTOCOL (LDAP) DIRECTORY SERVER

RELATED APPLICATION

This application is a continuation of U.S. application Ser. No. 09/495,157 filed Jan. 31, 2000, now U.S. Pat. No. 7,185,361, which is incorporated herein by reference.

BACKGROUND OF THE INVENTION

1. Field of the Invention

The present invention relates generally to user authentication mechanisms and more particularly to user authentication mechanisms for firewalls.

2. Related Art

Control over access to information technology (IT) resources is a common need today. A firewall can be used to protect IT resources behind the firewall. Network firewalls can enforce a site's security policy by controlling the flow of traffic between two or more networks. For example, a company might encourage file transfers to the company's network that assist employees, but might discourage file transfers of potentially sensitive company confidential information from the company network to external destinations. Firewalls often are placed between a corporate network and an external network such as, e.g., the Internet, or a partnering company's network. Firewalls can also be used to segment parts of a corporate network. A firewall system can provide both a perimeter defense to, e.g., an internal network, and a control point for monitoring access to and from specific networks such as, e.g., an external network.

Firewalls can control access at a network level, an application level, or both. At the network level, a firewall can restrict packet flow based on protocol attributes. For example, the packet's source address, destination address, originating transmission control protocol/user datagram protocol (TCP/UDP) port, destination port, and protocol type can be used for the control decisions. At an application level, a firewall can participate in communications between the source and destination applications with the firewall's control decisions being based on details of the conversation and other available information such as, e.g., previous connectivity or user identification. Thus, a firewall can authenticate users to control access to and from IT resources behind and before the firewall.

Firewalls can be packaged as system software, combined hardware and software, and, more recently, dedicated hardware appliances (e.g., embedded in routers, or easy-to-configure integrated hardware and software packages that can run on dedicated platforms). An example of an application-based firewall is the Gauntlet™ firewall available from Network Associates, Inc.

Firewalls can defend against attacks ranging from, e.g., unauthorized access, IP address "spoofing" (i.e., a technique by which hackers disguise traffic as coming from a trusted address to gain access to a protected network or resource), buffer overrun attacks, session hijacking, viruses and rogue applets, and rerouting of traffic. However, inherent limitations exist in certain services and protocols that conventional firewalls cannot remedy.

Conventionally, when software application programs sought to restrict what a user could do with the programs, the programs required identification of the user. For example, if a user desires access to sensitive corporate financial data in an accounting program, access to the data can be restricted by means of authentication mechanisms such as, e.g., a password. The application program therefore requires a list of users and identification information for the user for use in authenticating the user.

Early software application programs often included their own integrated authentication mechanisms. Users often use a variety of software application programs, each possibly having its own authentication mechanism. Users find it cumbersome to remember different passwords associated with each of the multiple software application programs.

IT resources used by companies today can include access to multiple software application programs and Internet based applications. For example, employees at a given company can use e-mail and groupware applications, and other office automation programs including, e.g., spreadsheets, word processors and presentation programs. As every application program conventionally has its own authentication mechanism, a separate database is initialized and updated for each application.

Authentication mechanisms can use a query to a database known as a directory that can store information about users. A directory is similar to a database in that one can store information in a directory and later retrieve the information from it. However, a directory is specialized in that a directory is typically designed for reading more than writing. A directory offers a static view of the information and allows simple updates without transactions. Thus, while a database is typically written to and read from frequently, a directory by comparison is primarily read from and is infrequently updated.

A directory service includes all the functions of a directory and adds a network protocol that can be used to access the directory. Standardization is desirable in implementing a directory service.

An early standard for directory service was the directory access protocol (DAP), which originated in the European standards organization. DAP although specifying a vast, feature-rich protocol for storing and encoding directory information, was unwieldy in size.

Today a new protocol, lightweight directory access protocol (LDAP), is gaining wide acceptance in business. The LDAP standard defines an information model for a directory, a namespace for defining how directory information is referenced and organized, and a network protocol for accessing information in the directory. LDAP can also include an application programming interface (API). The LDAP protocol mandates how client and server computers can communicate with the LDAP directory. However, LDAP does not mandate how data should be stored. More and more companies today use an LDAP directory server to store a database of employees. The LDAP directory generally can store an employee name, phone number, address and other information about the employee, and a password for modifying the employee's information.

Firewalls also maintain a database of users and are operative to prompt users for an identifying user identifier and password. These conventional firewalls require that employee names and passwords be entered into a firewall authentication database. Maintenance of the firewall authentication database is especially burdensome where there are a large number of employees that are frequently leaving or joining a company or when a company has a large number of firewalls. Accordingly, what is needed is a mechanism for reducing this administrative burden. More specifically, what is needed is a mechanism for leveraging an existing LDAP directory server as part of a firewall's authentication process.

In this manner, an existing LDAP directory server can be used as a central directory that stores the data used by all applications.

SUMMARY OF THE INVENTION

A system, method and computer program product for enabling the authentication of users to a firewall using a lightweight directory access protocol (LDAP) directory server is provided by the present invention. The firewall can be configured through a graphical user interface to implement an authentication scheme. The authentication scheme is based upon a determination of whether information contained in one or more LDAP entries satisfy an authorization filter. It is a feature of the present invention that the authentication scheme can be configured independently of specifically stated field requirements or schema of the firewall. In accordance with the present invention, the authentication scheme can be flexibly specified to interact with a LDAP directory that has been uniquely developed for a company's internal needs. The company's investment in its existing administrative infrastructure can therefore be leveraged to a greater degree.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF THE INVENTION

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Figure 1:
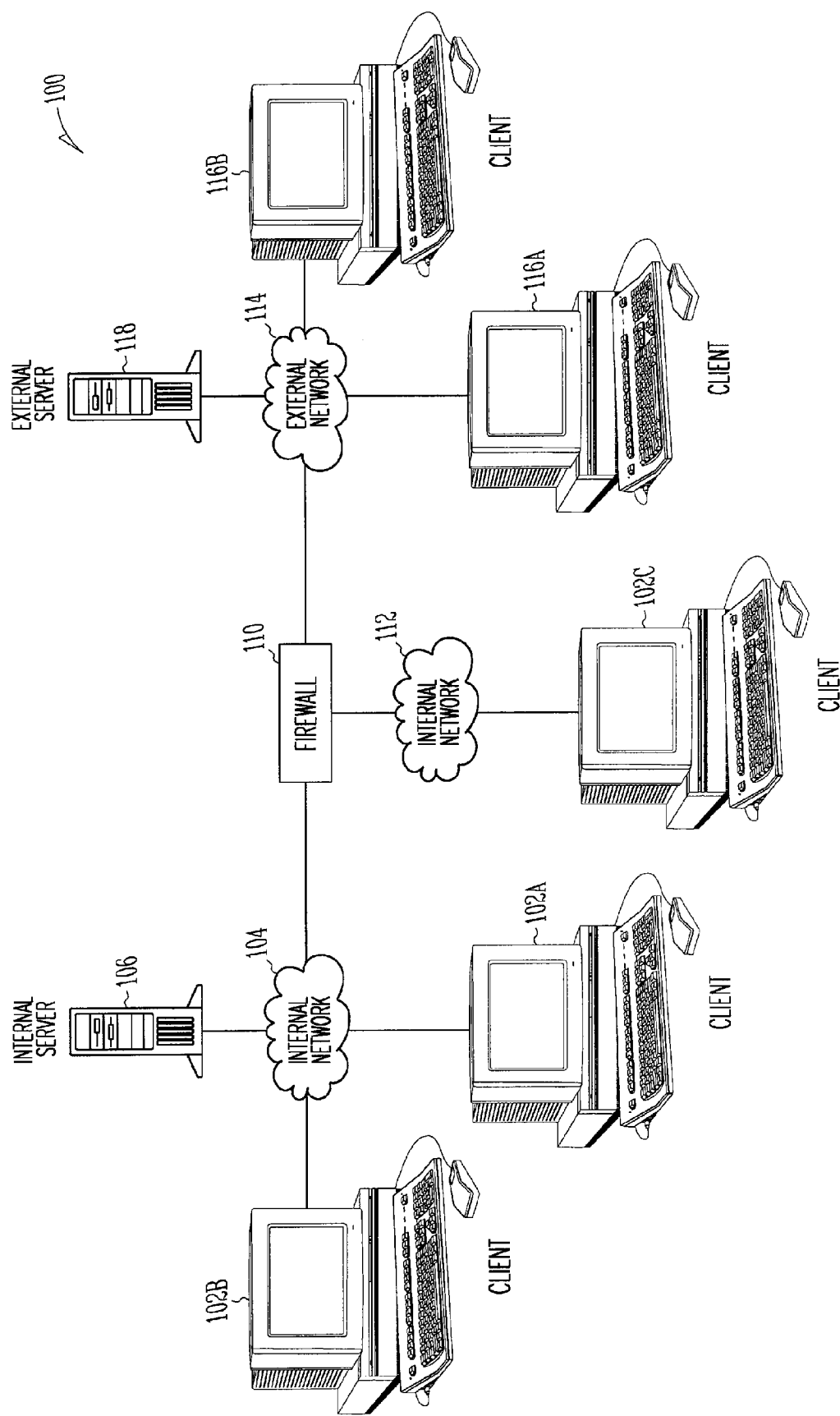
FIG. 1 illustrates a communications network including a firewall.

FIG. 1 illustrates an example embodiment of a communications network 100 including client computers 102a and 102b coupled via an internal network 104 to an internal server computer 106 and a firewall 110. Communications network 100 also includes a client computer 102c coupled via an internal network 112 to firewall 110. Finally, communications network 100 includes client computers 116a and 116b coupled via an external network 114 to an external server computer 118 and firewall 110. External network 114 can represent, e.g., the Global Internet, or a partnering company's network.

Network firewall 110 can enforce a business's security policy by controlling the flow of traffic between two or more networks such as, e.g., internal networks 104 and 112 and external network 114. In general, firewall 110 serves to isolate internal networks 104 and 112 from one another and also from external network 114.

As illustrated in FIG. 1, firewall 110 can be used to segment parts of a corporate network. For example, firewall 110 can be used to control information flow between a corporation's internal networks 104, 112. Firewall 110 can also provide a perimeter defense between an internal network 104, 112 and an external network 114.

Figure 2:
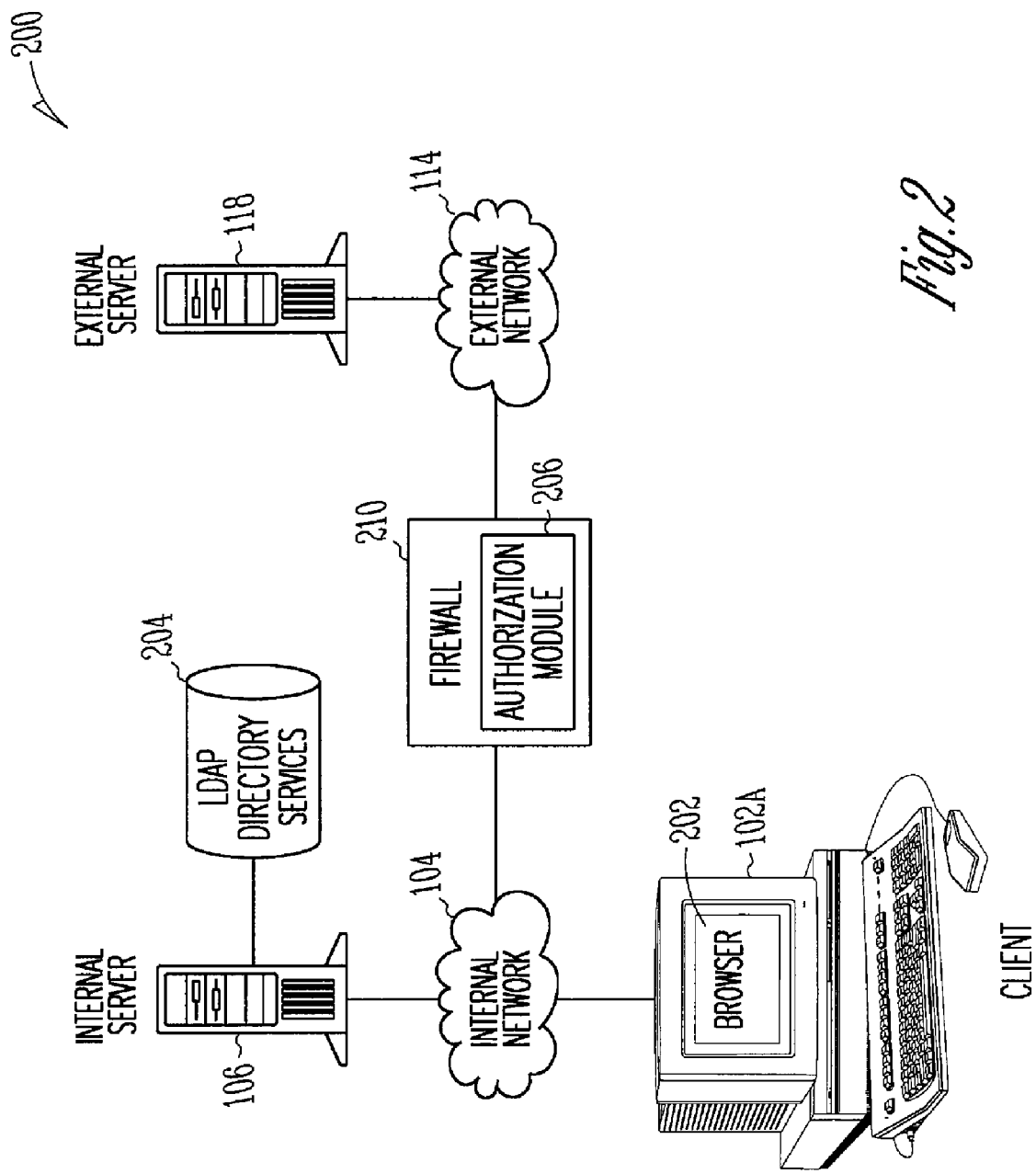
FIG. 2 illustrates a communications network including a lightweight directory access protocol (LDAP) directory server and an authorization module within a firewall.

FIG. 2 illustrates an example embodiment of a communications network 200 that includes client computer 102a coupled via internal network 104 to internal server 106 and to firewall 210. Firewall 210 is also coupled via external network 114 to external server 118.

As shown, client computer 102a includes a browser 202. Browser 202 can in one embodiment be an Internet browser that provides a graphical user interface to network resources. Browser 202 is generally operative to parse and make requests to network resources such as, e.g., external server 118, and present the results of the request to a client user viewing client computer 102a.

Figure 4:
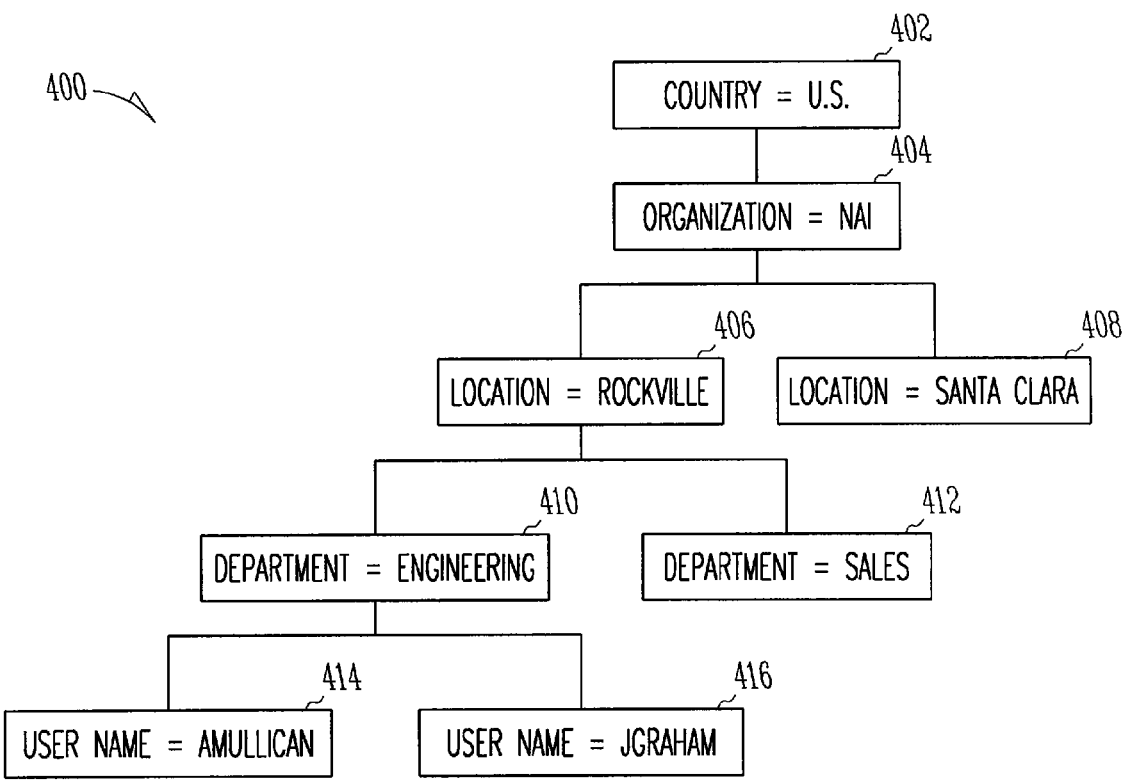
FIG. 4 illustrates an example embodiment of an LDAP directory tree.

Internal server 106 is shown including a lightweight directory access protocol (LDAP) directory 204, which can be configured to store employee information. For example, a human resources database could be stored as an LDAP directory having a directory structure such as that illustrated in FIG. 4. As illustrated, LDAP directory tree 400 includes country 402 set in this example to US, organization 404 set to NAI, location 406 set to Rockville and location 408 set to Santa Clara, department 410 set to engineering and department 412 set to sales, and username 414 set to amullican and username 416 set to jgraham.

External server 118 can include an Internet server application. In one embodiment, the Internet server application supports file transfer protocol (FTP) communication. As would be apparent to those skilled in the relevant art, other types of server applications can be included on external server 118 including, e.g., databases, and electronic mail.

Firewall 210 is shown including an authorization module 206. Authorization module 206 is used to authenticate a client user (e.g., client computer 102a) to determine if the client user's communication is authorized to pass through firewall 210. Conventional firewalls 110 included their own database having a list of users and passwords, to enable authentication through firewall 110.

In accordance with the present invention, firewall 210 does not authenticate users using its own database. Rather, firewall 210 authenticates users using information contained within LDAP directory 204. As will be described in greater detail below, firewall 210 can authenticate users through an authentication scheme that can be based upon the unique composition of an organization's LDAP directory 204.

It is a feature of the present invention that the authentication scheme of the present invention can operate independently of specifically stated field requirements or schema of the firewall 210. In other words, an organization's LDAP directory 204 need not be modified to conform to a schema imposed by the firewall 210. Moreover, resistance to such a modification will not result in the maintenance of multiple directories.

In accordance with the present invention, the authentication scheme can be flexibly specified to interact with an existing LDAP directory that has been uniquely developed for a organization's internal needs. This framework enables a firewall administrator to seamlessly integrate a firewall product into an existing administrative infrastructure. The organization's investment in the existing administrative infrastructure can therefore be leveraged to a greater degree.

Figure 3:
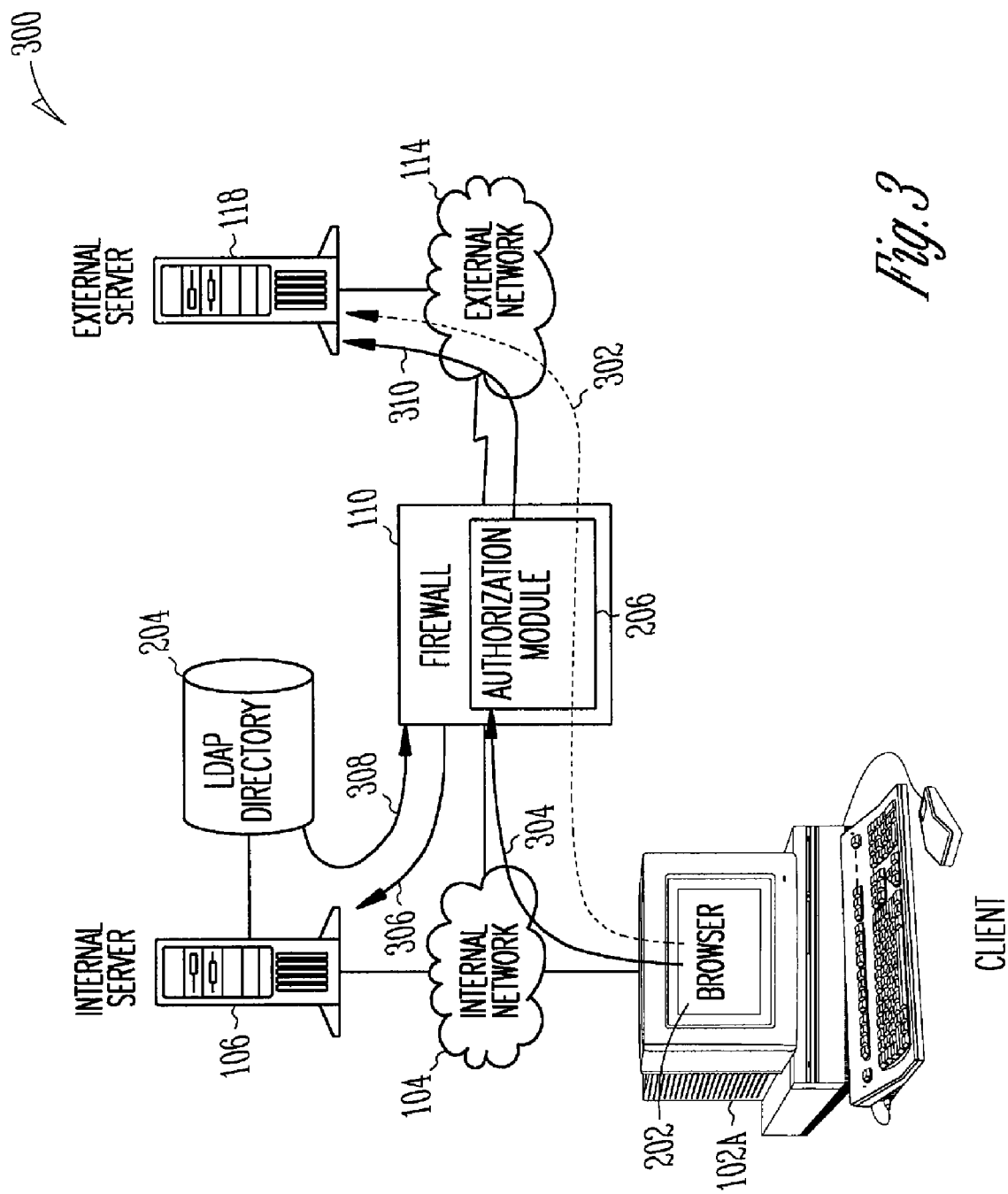
FIG. 3 illustrates the authentication of a client user through a firewall.

FIG. 3 illustrates the authentication process that is implemented by firewall 210. In the illustrated example, firewall 210 authenticates a client user at client computer 102a running a browser 202 that is attempting to access an application or resource on external server 118. This access path is illustrated by path 302.

This authentication process begins when client computer 102a initiates a network resource request 304 from browser 202. The network resource request 304 is intercepted by firewall 210. Authorization module 206 within firewall 210 challenges the client user to identify himself or herself. A challenge could in one embodiment include a request for entry of a username and password. Upon receipt of the identification information, authorization module 206 searches an authentication database (not shown) to identify an authentication method (e.g., LDAP authentication). If no entry in the authentication database is found for the client user, then a default authentication method can be used. In the LDAP authentication process, authorization module 206 binds to LDAP directory 204 and uses the userPassword attribute for authentication.

After authorization module 206 authenticates the client user, authorization module 206 then determines whether the client user is authorized to have his access request fulfilled. The LDAP authorization process is illustrated as communications 306 and 308. Communications 306 and 308 are facilitated using the LDAP protocol and may utilize the secure sockets layer.

If per-user authorization is configured, authorization module 206 determines whether one or more attributes of the client user's LDAP entry satisfies an authorization filter. If the one or more attributes of the client user's LDAP entry does not satisfy the authorization filter, then authorization module 206 determines that the authorization fails. If the authorization filter is satisfied, then the client user's network resource request is allowed through firewall 210. This allowed connection is illustrated in FIG. 3 as path 310.

To support per-user authorization, an administrator configures an authorization filter to use when authenticating users. One or more attributes in the client user's LDAP directory entry and associated values can be selected for the authorization filter. Once configured, authorization module 206 can verify that the LDAP entry used in the bind call satisfies the authorization filter before allowing the user access to/through the firewall.

Figure 5:
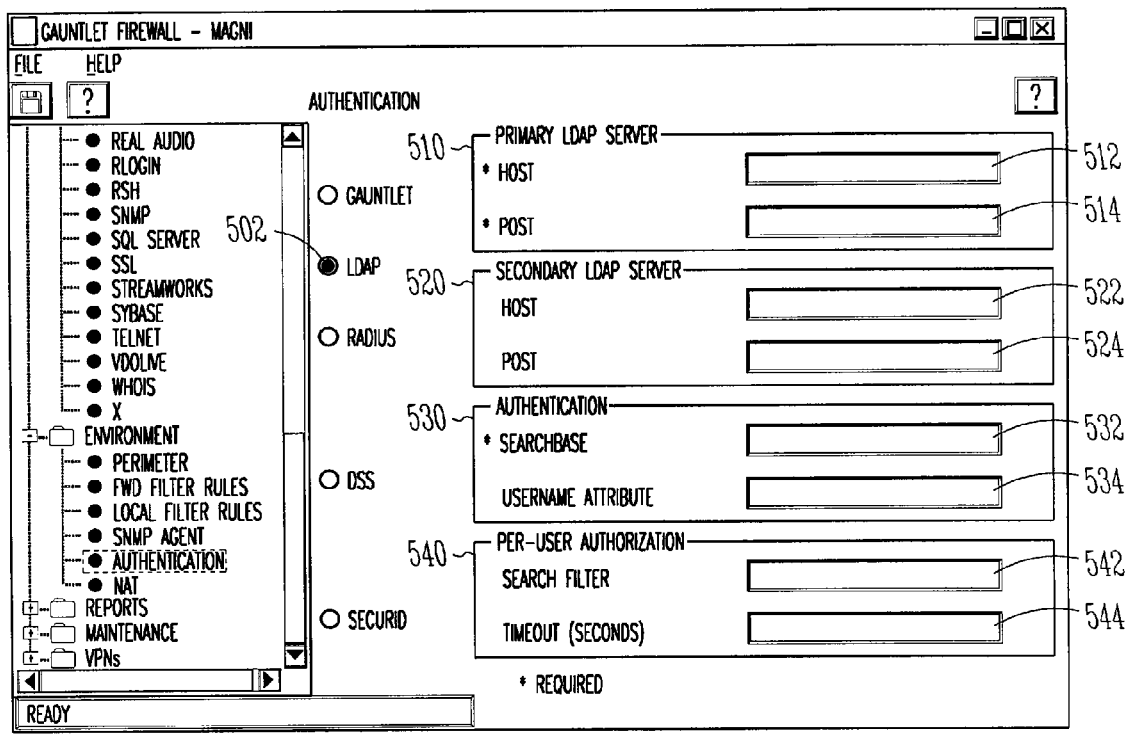
FIG. 5 illustrates an embodiment of a graphical user interface for configuring the LDAP authentication feature.

FIG. 5 illustrates an example embodiment of a graphical user interface (GUI) 500 of a firewall systems administrator application screen. As shown by a selected radio button, LDAP authentication 502 has been selected. GUI 500 includes a primary LDAP server settings area 510, a secondary LDAP server settings area 520, an authentication settings area 530, and a per-user authorization settings area 540.

The primary LDAP server settings area 510 includes a host field 512 and a port field 514. The host field 512 can be used to enter an IP address or host name of a primary LDAP server. The port field 514 can be used to enter the port to be used on the primary LDAP server.

The secondary LDAP server settings area 520 also includes a host field 522 and a port field 524. The host field 522 can be used to enter an IP address or host name of a secondary LDAP server. The port field 524 is used to enter the port to be used on the secondary LDAP server. Fields 522,524 can be left blank if no secondary LDAP server is being used.

The authentication settings area 530, can include searchbase field 532 and a username attribute field 534. The searchbase field 532 can be used to indicate the top of the directory tree 400 such as, e.g., country 402, organization 404, location 406, and department 410, so that a lookup can be within that portion of the directory tree. For example, a set of attribute pairs such as, e.g., o=NAI, c=US to append to all requests to the LDAP server can be entered. The username attribute field 534 can include a default username attribute such as, e.g., uid. The username attribute field 534 can be used in performing per-user authorization.

The per-user authorization settings area 540 includes a search filter field 542 and a timeout field 544. The timeout field 544 can include a default value such as, e.g., 60 seconds. For example, timeout field 544 can be used to limit the amount of time the authorization filter query can take. If the time is exceeded, the authorization fails.

The search filter field 542 is used by firewall 210 in identifying the appropriate fields that are the subject of the LDAP directory authentication query. Upon receipt of a response from the LDAP directory 204, firewall 210 can then determine whether the client user is authorized to authenticate through the firewall 210.

In general, the authorization filter can contain any LDAP-valid combination of attributes and values, including object classes. At its simplest, the authorization filter specifies a single attribute and value pair. For example, the search filter field 542 can be used to enter a search filter expression such as "objectclass=gauntletUser."

Consider another example where LDAP directory 204 is configured by the company to include a field that would provide an access code level for each user. For example a "1" could correspond to only e-mail access, while a 5 could mean full access to all Internet services including world wide web browsing. In this environment, an authorization filter can be specified as "(&(objectclass=gUser)(status>=5))".

It should be noted that the authorization process need not be based on per-user authorization. In another embodiment, the authorization process can be based on a per-service authorization. In this embodiment, the per-service authorization can include an authorization for protocol services. Examples of protocol services include FTP, simple mail transport protocol (SMTP) e-mail, hypertext transport protocol (HTTP), etc. The per-service authorization can also be based on LDAP directory information. For example, authorization module 206 can use group memberships to determine whether a client user can use HTTP through firewall 210. To satisfy this authorization process, the authenticated user must be a member of the "web-users" group in the LDAP directory.

In one embodiment, the per-service authorization process uses the standard groupofNames and groupOfUniqueNames object classes for authorization decisions. In general, a mechanism can be included that supports the specification of arbitrary group names for each service to be controlled. Control can then be based on a per-proxy basis or a per-policy basis.

Specification of per-service authorization criteria can also be implemented using the search filter field 542. In general, a different search (or authorization) filter can be provided for each service. For example, a search filter field can also be included in GUI 500 to determine whether, e.g., a user is authorized to perform a file transfer, to send e-mail, or to access the world wide web. A search filter field can also be included in GUI 500 to determine whether, e.g., a user is a member of a particular group such as, e.g., engineering department 410, and if so, then particular services can be authorized based on being part of that group.

As noted, it is a feature of the present invention that firewall 210 can support arbitrary LDAP directory schema. Accordingly, firewall 210 does not require additional firewall-specific object classes or attributes in the directory. Customers can populate the LDAP directories with whatever data they require. This authentication environment can be flexibly applied across multiple organizations each having their own sets of directory information. Indeed, the concepts of the present invention can be used to implement an authorization filter that relies on portions of information that are stored in distinct LDAP directories. This distributed authentication scheme enables an organization to implement segmented management of the user database.

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of configuring a firewall process that executes on a device, the method comprising:
   receiving a host computer identification, the host computer including at least one directory schema defined by an entity and configured to store information concerning the entity's organization;
   receiving authentication settings for the firewall process to use in authenticating network resource requests received over a computer network by the firewall process as a function of the at least one directory schema;
   generating an authorization filter for the firewall process to apply to computer network traffic as a function of the one or more authentication settings and the at least one directory schema; and
   enabling the firewall process to intercept computer network resource requests from client users on an internal computer network and authorize computer network resource requests based on a comparison of at least a portion of the at least one directory schema to the authorization filter.

2. The method of claim 1, further comprising:
   receiving a host port setting, wherein communication between the firewall and the host computer is performed over a port identified by the host port setting.

3. The method of claim 2, wherein the port setting specifies one or more ports and a secure socket layer communication setting to cause communication between the firewall and the host computer to be performed in a secure fashion.

4. The method of claim 1, wherein at least one directory schema is a lightweight directory access protocol directory schema.

5. The method of claim 4, wherein the lightweight directory access protocol directory schema is preexisting.

6. The method of claim 1, wherein receiving the authentication settings includes:
   receiving an identification of at least one directory schema and a portion of the at least one directory schema to search.

7. The method of claim 6, wherein:
   receiving the authentication settings includes receiving one or more user attributes; and
   generating the authorization filter includes generating the authorization filter implementing a per-user authentication scheme as a further function of the one or more user attributes.

8. The method of claim 1, wherein generating the authorization filter includes implementing a per-service authentication scheme.

9. A non-transitory computer program product for enabling a processor in a computer system to implement a firewall configuration process, said computer program product comprising:
   a non transitory computer usable medium having computer readable program code embodied in said medium for causing a program to execute on the computer system, said computer readable code comprising:
   first computer readable program code for enabling the computer system to receive a host computer identification, the host computer including at least one directory schema defined by an entity and configured to store information concerning the entity's organization;
   second computer readable program code for enabling the computer system to receive authentication settings for the firewall to use in authenticating network resource requests as a function of the at least one directory schema;
   third computer readable program code for enabling the computer system to generate an authorization filter as a function of the one or more authentication settings and the at least one directory schema; and
   fourth computer readable program code for enabling the computer system to enable the firewall to intercept network resource requests from client users on an internal network and authorize network resource requests based on a comparison of at least a portion of the at least one directory schema to the authorization filter.

10. The non-transitory computer program product of claim 9, said computer readable code further comprising:
    fifth computer readable program code for enabling the computer system to receive a host port setting, wherein communication between the firewall and the host computer is performed over a port identified by the host port setting.

11. The non-transitory computer program product of claim 10, wherein the port setting specifies one or more ports and a secure socket layer communication setting to cause communication between the firewall and the host computer to be performed in a secure fashion.

12. The non-transitory computer program product of claim 9, wherein at least one directory schema is a lightweight directory access protocol directory schema.

13. The non-transitory computer program product of claim 12, wherein the lightweight directory access protocol directory schema is preexisting.

14. The non-transitory computer program product of claim 9, wherein receiving the authentication settings of the second computer readable program code includes receiving an identification of at least one directory schema and a portion of the at least one directory schema to search.

15. The non-transitory computer program product of claim 14, wherein:
    receiving the authentication settings of the second computer readable program code includes receiving one or more user attributes; and
    generating the authorization filter of the third computer readable program code includes generating the authorization filter implementing a per-user authentication scheme as a further function of the one or more user attributes.

16. The non-transitory computer program product of claim 9, wherein generating the authorization filter of the third computer readable program code includes implementing a per-service authentication scheme.

* * * * *